May 24, 1949. G. A. NICK 2,471,235
ANIMAL SKINNING DEVICE
Filed July 11, 1944 2 Sheets-Sheet 1
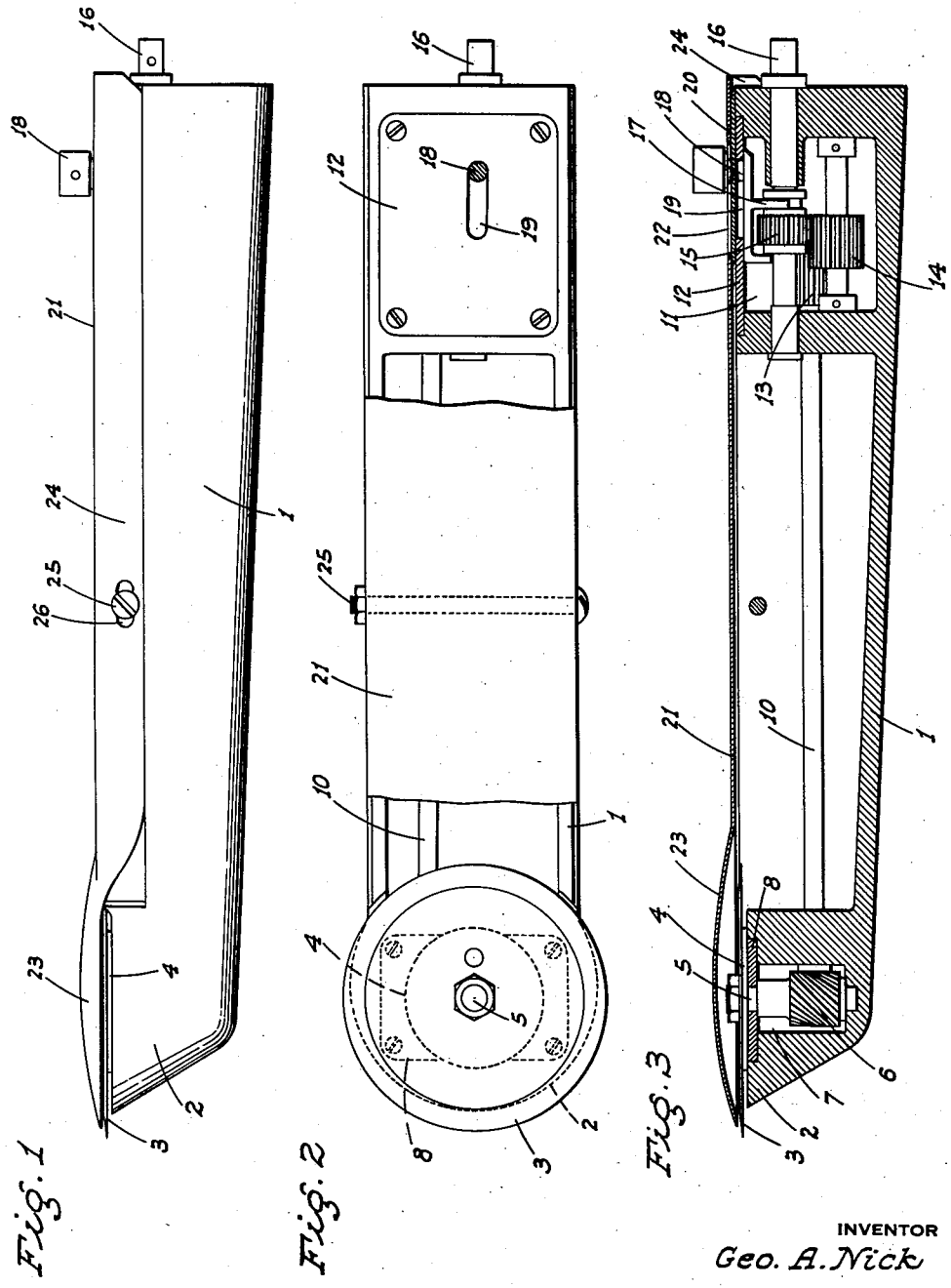
INVENTOR
Geo. A. Nick
BY
ATTORNEYS May 24, 1949.　　　　　G. A. NICK　　　　　2,471,235
ANIMAL SKINNING DEVICE
Filed July 11, 1944　　　　　　　　　　　2 Sheets-Sheet 2
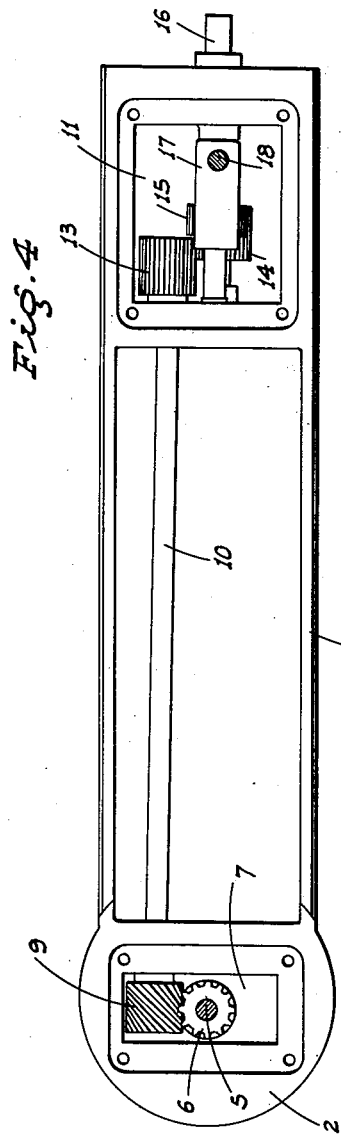
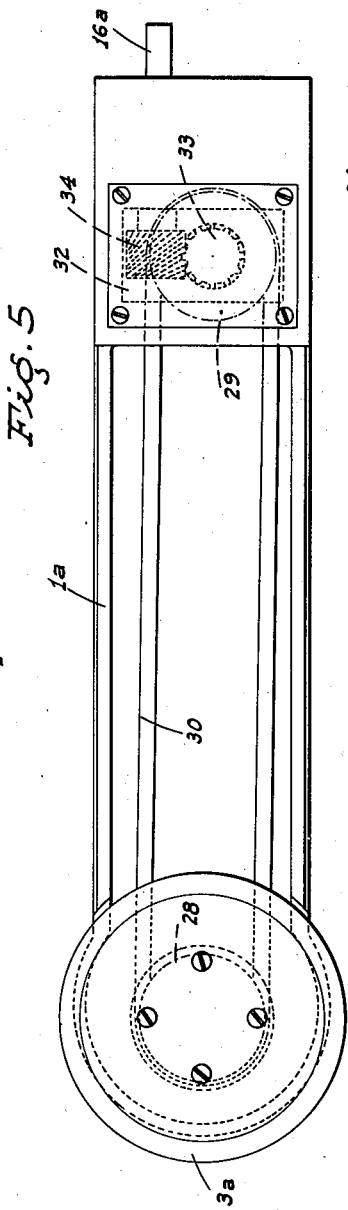
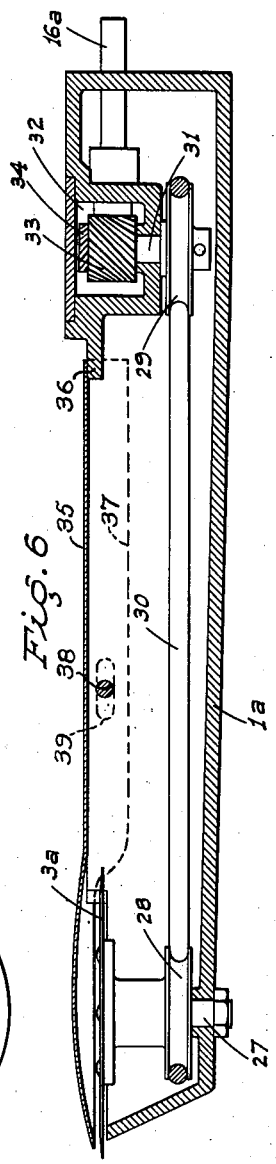
INVENTOR
Geo. A. Nick
BY
ATTORNEYS

Patented May 24, 1949

2,471,235

UNITED STATES PATENT OFFICE 2,471,235

ANIMAL SKINNING DEVICE

George A. Nick, Sacramento, Calif.

Application July 11, 1944, Serial No. 544,398

2 Claims. (Cl. 30—276)

This invention relates to carcass skinning—an operation now generally performed with a hand knife.

The objects of the present invention are to provide a power driven skinning tool which is much faster and easier to operate than a hand knife; one which allows an accurate separation between the skin and the meat of the carcass to be more readily effected; and one which can be easily adjusted to vary the depth of cut without any chance that the cutting element will penetrate too deep.

A further object of the invention is to provide a simple and inexpensive device, and yet one which will be exceedingly effective for the purpose for which it is designed.

Figure 1 is a side elevation of one form of my improved carcass skinning tool.

Figure 2 is a top plan view of the same with the cover partly broken away.

Figure 3 is a longitudinal section of the tool.

Figure 4 is a plan view of the same with the main cover and cutting disc removed, as well as the cover plates of the gear boxes.

Figure 5 is a top plan view of a tool with the cover removed showing a modified cutting disc drive.

Figure 6 is a longitudinal section of the same but showing the cover in place.

Referring now more particularly to the characters of reference on the drawings, and particularly at present to Figs. 1 to 4, the tool comprises an elongated hollow but rigid body 1 which supports the cutting member and its operating mechanism and also serves as a handle. The body is flat on top from end to end and is preferably rounded on the bottom; being formed at its forward end with a somewhat enlarged head 2 which is circular in a horizontal plane and slopes back at its front end toward the bottom of the body, as shown.

Disposed over the head 2 and of somewhat greater diameter so as to project beyond the periphery thereof is a circular cutting disc 3. This disc 3 is non-turnably but removably mounted on a circular supporting pad 4 fixed with a depending spindle 5 on which is mounted a spiral gear 6. The spindle and gear project into a gear box 7 formed in the head 2, the spindle being suitably journaled in the head at the bottom of the box and also in the cover plate 8 of the box, which is immediately under the pad 4 and is countersunk in the head, as shown in Fig. 3.

The gear 6 is driven by another spiral gear 9 disposed in the box 7 and from which a shaft 10 extends lengthwise in the body and into another gear box 11 formed in the body adjacent its opposite end, said box 11 being closed by a removable cover plate 12 preferably set flush with the top of the body. A spur gear 13 on the shaft 10 within the box meshes with another similar gear 14 which is axially staggered relative thereto so that the gears only partially overlap each other. Another gear 15 is non-turnably but slidably mounted on a drive shaft 16 within the box 11; said shaft projecting from the back end of the body and being there adapted for driving connection in a conventional manner with a flexible drive shaft leading from an electric motor (not shown).

The gear 15 is positioned to mesh both with the gear 14 and the gear 13; being movable along the shaft 16 within the box 11 so that at one end of its movement gear 15 will mesh with gear 14 only on that portion thereof clear of the gear 13, while at the other end of its travel said gear 15 will mesh only with the gear 13 and on that portion thereof beyond the gear 14. In this manner rotation in opposite directions may be selectively imparted to the shaft 10 and hence to the cutting disc 3, with a constant rotation of the shaft 16 in one direction, as will be evident. The direction of rotation of the cutting disc may thus be reversed as the operator may desire. Such change in direction is controlled by a shift fork 17 engaging the gear 15 and having an upstanding operating stem 18 projecting through a longitudinal slot 19 in the cover plate 12. A sealing strip 20 is mounted on the stem over the plate 12 and slot 19 so as to prevent any possible splashing of lubricant through the slot.

The entire top surface of the body is covered by a plate 21 having a slot 22 through which the stem 18 projects. Said plate at its forward end is formed with a circular convex guard and cutting-depth control hood 23 over the disc 3 in close relation thereto, and arranged to leave a small peripheral portion of the cutting disc at the front projecting from under the hood. The cover 21 includes side flanges 24 straddling the sides of the body rearwardly of the head 2. Said cover plate is slidable on the body to adjust the relative extent of projection of the disc from the hood, and is maintained in any desired position by a clamping bolt 25 mounted in and projecting transversely of the body through longitudinal slots 26 in the flanges 24.

In the type of tool shown in Figs. 5 and 6 the form and general arrangement is the same, but the cutting disc 3a associated with the body 1a is non-reversible, unless the drive motor itself is reversible. In this type of the tool the cutting disc is turnable on a fixed spindle 27 and is mounted in unitary connection with a pulley 28. Another pulley 29 is mounted in the body adjacent its rear end, the pulleys being connected by an endless belt 30 enclosed of course within the hollow body 1a. The pulley 29 is mounted on a stem 31 projecting into a gear box 32 in the body 1a above the pulley. A spiral gear 33 fixed on the stem within said box meshes with a similar gear 34 from which the drive shaft 16a projects from the rear end of the body. In this form of the invention the cover 35 is shorter than in the other form and at its rear end rests on and is slidable over a ledge 35 projecting forwardly from the gear box 32. Its sides 37 overlap the sides of the body 1 as in the other form of the invention and it is adjustable through the medium of the pin 38 and slots 39.

In operating either type of tool the guard hood is first set to give any desired depth of cut of the cutting disc, and with the disc rotated the skin of the carcass is held away from the meat with one hand, as usual, while the tool is held in the other hand at the proper angle and manipulated so that the exposed portion of the cutting disc severs the skin from the meat along the desired line of cleavage.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A carcass skinning tool comprising an elongate body forming a handle, a cutting disc mounted on the body adjacent its forward end outwardly of and adjacent one longitudinal face thereof in substantially parallel relation thereto, a drive shaft extending lengthwise of the body and projecting from the rear end thereof, another shaft operatively connected to the disc and extending along the body to and overlapping the drive shaft in parallel spaced relation, a spur gear on the overlapping portion of said other shaft, a second spur gear meshing with the first gear but partially offset therefrom whereby portions of the gears are clear of each other, and a third gear slidably but non-turnably mounted on the drive shaft in position to mesh with both first named gears and adapted to shift along the drive shaft from a position meshing with the clear portion only of the first gear to a position meshing with the clear portion only of the first gear to a position meshing with the clear portion only of the second gear.

2. A carcass skinning tool comprising an elongated body forming a handle, said body being in the main hollow and initially open on top, a cutting disc rotatably mounted on the body adjacent its forward end outwardly of and adjacent the initially open top thereof in substantially parallel relation, power driven means in the handle connected in driving relation to the disc, and a longitudinal cover plate secured on the body over said initially open top thereof, said cover plate being formed at the front end as a circular guard and cutting depth control hood extending over the disc, the latter having a peripheral edge portion projecting forwardly in advance of said hood; said cover plate having side flanges depending along opposite sides of the body, longitudinal slots in said side flanges, and clamping screw means extending through the slots into the body, the cover plate being longitudinally slidable, when the screw means are loosened, whereby to adjust the position of said circular guard and cutting depth control hood relative to the disc.

GEORGE A. NICK.

REFERENCES CITED

The following references are of record in the file of this patent:

UNITED STATES PATENTS

| Number | Name | Date |
|---|---|---|
| 194,794 | Wightman | Sept. 4, 1877 |
| 355,086 | Howe | Dec. 28, 1886 |
| 1,341,237 | Koller | May 25, 1920 |
| 1,514,104 | Ruffing | Nov. 4, 1924 |

FOREIGN PATENTS

| Number | Country | Date |
|---|---|---|
| 10,358 | Great Britain | Jan. 31, 1907 |
| 26,408 | France | July 3, 1923 |
| 122,898 | Great Britain | Feb. 6, 1919 |
| 314,438 | Italy | Jan. 26, 1934 |